(12) United States Patent
Cui et al.

(10) Patent No.: US 11,345,482 B2
(45) Date of Patent: May 31, 2022

(54) AERONAUTICAL DISPLAY SYSTEM AND METHOD

(71) Applicant: Milton Academy, Milton, MA (US)

(72) Inventors: Daming Cui, Milton, MA (US); Noah Shane Fuller, Milton, MA (US); Sarah Ting-Ting Hsu, Milton, MA (US); Patrick Jiacheng Huang, Milton, MA (US); Max Hui, Milton, MA (US); Bradley Moriarty, Milton, MA (US)

(73) Assignee: MILTON ACADEMY, Milton, MA (US)

( * ) Notice: Subject to any disclaimer, the term of this patent is extended or adjusted under 35 U.S.C. 154(b) by 214 days.

(21) Appl. No.: 16/657,862

(22) Filed: Oct. 18, 2019

(65) Prior Publication Data

US 2020/0124442 A1 Apr. 23, 2020

Related U.S. Application Data

(60) Provisional application No. 62/747,217, filed on Oct. 18, 2018.

(51) Int. Cl.
| | | |
|---|---|---|
| *B64D 43/00* | (2006.01) | |
| *G06F 3/147* | (2006.01) | |
| *G01C 23/00* | (2006.01) | |
| *B64D 43/02* | (2006.01) | |
| *G07C 5/08* | (2006.01) | |
| *G07C 5/00* | (2006.01) | |

(52) U.S. Cl.
CPC .......... *B64D 43/00* (2013.01); *G01C 23/005* (2013.01); *G06F 3/147* (2013.01); *G07C 5/008* (2013.01); *G07C 5/0825* (2013.01); *B64D 43/02* (2013.01)

(58) Field of Classification Search
None
See application file for complete search history.

(56) References Cited

U.S. PATENT DOCUMENTS

| | | | |
|---|---|---|---|
| 6,389,333 B1 | 5/2002 | Hansman | |
| 6,486,799 B1 | 11/2002 | Still | |
| 9,889,947 B1 | 2/2018 | Liberman | |
| 2003/0193411 A1 | 10/2003 | Price | |
| 2006/0184253 A1 | 8/2006 | Andrews | |
| 2009/0224107 A1 | 9/2009 | McLean | |

(Continued)

FOREIGN PATENT DOCUMENTS

WO    WO-2019189393 A1 * 10/2019 ......... G02B 27/0101

OTHER PUBLICATIONS

Non-Final Office Action issued in U.S. Appl. No. 16/657,870 dated Jun. 4, 2021.

(Continued)

*Primary Examiner* — Jonathan M Dager
*Assistant Examiner* — Garrett F Evans
(74) *Attorney, Agent, or Firm* — Brian J. Colandreo; Jeffrey T. Placker; Holland & Knight LLP

(57) ABSTRACT

A computer-implemented method, computer program product and computing system for receiving a current operating value concerning an operating condition of an aircraft; rendering the current operating value within a magnified operating window of a glass cockpit of the aircraft; and locating the magnified operating window along a fixed range of operating values for the aircraft based, at least in part, upon the current operating value.

18 Claims, 13 Drawing Sheets

(56) References Cited

U.S. PATENT DOCUMENTS

| | | | |
|---|---|---|---|
| 2010/0023187 A1* | 1/2010 | Gannon | G01C 23/00 |
| | | | 701/7 |
| 2010/0097293 A1 | 4/2010 | McMahon | |
| 2018/0017410 A1* | 1/2018 | Ludtke, II | B64D 43/02 |
| 2020/0124442 A1 | 4/2020 | Cui | |
| 2021/1122854 | 4/2020 | Cui | |

OTHER PUBLICATIONS

Notice of Allowance issued in U.S. Appl. No. 16/657,870 dated Aug. 20, 2021.

* cited by examiner

AERONAUTICAL DISPLAY SYSTEM AND METHOD

RELATED APPLICATION(S)

This application claims the benefit of U.S. Provisional Application No. 62/747,217, filed on 18 Oct. 2018, the entire contents of which are incorporated herein by reference.

TECHNICAL FIELD

This disclosure relates to aeronautical displays and, more particularly, to aeronautical display within glass cockpits.

BACKGROUND

Referring to FIG. 1, there is shown an example of prior art glass cockpit display 10 and well as various examples of prior art angle-of-attack gauges 12, 14, 16, 18 for use within the cockpit of an aircraft.

As is known in the art, a glass cockpit is an aircraft cockpit that features electronic (digital) flight instrument displays, typically large LCD screens, rather than the traditional style of analog dials and gauges. While a traditional cockpit relies on numerous mechanical gauges to display information, a glass cockpit uses several displays driven by flight management systems, that can be adjusted (multi-function display) to display flight information as needed. This simplifies aircraft operation and navigation and allows pilots to focus only on the most pertinent information.

Such glass cockpit displays (e.g., prior art glass cockpit 10) typically includes an airspeed indicator (e.g., air speed indicator 20) and an altitude indicator (e.g., altitude indicator 22). As is known in the art, air speed indicator 20 may include scrolling airspeed tape 24 (that displays a scrolling range of airspeeds) and stationary magnified window 26 (that display a magnified view of the actual speed of the aircraft). As is known in the art, altitude indicator 22 may include scrolling altitude tape 28 (that displays a scrolling range of altitudes) and stationary magnified altitude window 30 (that displays a magnified view of the actual altitude of the aircraft).

The angle-of-attack gauges (e.g., angle-of-attack gauges 12, 14, 16, 18) are typically mechanical in nature and are typically not included within (or incorporated into) glass cockpit display 10, thus requiring the pilot of the aircraft to take their eyes off of glass cockpit display 10 to read the angle of attack gauge (e.g., angle-of-attack gauges 12, 14, 16, 18).

SUMMARY OF DISCLOSURE

Concept 1

In one implementation, a computer-implemented method is executed on a computing device and includes: receiving a current operating value concerning an operating condition of an aircraft; rendering the current operating value within a magnified operating window of a glass cockpit of the aircraft; and locating the magnified operating window along a fixed range of operating values for the aircraft based, at least in part, upon the current operating value.

One or more of the following features may be included. The current operating value may be an airspeed of the aircraft and the fixed range of operating values is a range of possible airspeeds for the aircraft. The current operating value may be an altitude of the aircraft and the fixed range of operating values is a range of possible altitudes for the aircraft. The magnified operating window may be relocated along the fixed range of operating values for the aircraft based, at least in part, upon a change in the current operating value. A visual acceptability indicator may be rendered concerning the current operating value of the aircraft. The visual acceptability indicator concerning the current operating value of the aircraft may include a color change. The visual acceptability indicator concerning the current operating value of the aircraft may be configured to indicate an acceptable operating condition for the aircraft. The visual acceptability indicator concerning the current operating value of the aircraft may be configured to indicate an unacceptable operating condition for the aircraft.

In another implementation, a computer program product resides on a computer readable medium and has a plurality of instructions stored on it. When executed by a processor, the instructions cause the processor to perform operations including: receiving a current operating value concerning an operating condition of an aircraft; rendering the current operating value within a magnified operating window of a glass cockpit of the aircraft; and locating the magnified operating window along a fixed range of operating values for the aircraft based, at least in part, upon the current operating value.

One or more of the following features may be included. The current operating value may be an airspeed of the aircraft and the fixed range of operating values is a range of possible airspeeds for the aircraft. The current operating value may be an altitude of the aircraft and the fixed range of operating values is a range of possible altitudes for the aircraft. The magnified operating window may be relocated along the fixed range of operating values for the aircraft based, at least in part, upon a change in the current operating value. A visual acceptability indicator may be rendered concerning the current operating value of the aircraft. The visual acceptability indicator concerning the current operating value of the aircraft may include a color change. The visual acceptability indicator concerning the current operating value of the aircraft may be configured to indicate an acceptable operating condition for the aircraft. The visual acceptability indicator concerning the current operating value of the aircraft may be configured to indicate an unacceptable operating condition for the aircraft.

In another implementation, a computing system includes a processor and memory is configured to perform operations including: receiving a current operating value concerning an operating condition of an aircraft; rendering the current operating value within a magnified operating window of a glass cockpit of the aircraft; and locating the magnified operating window along a fixed range of operating values for the aircraft based, at least in part, upon the current operating value.

One or more of the following features may be included. The current operating value may be an airspeed of the aircraft and the fixed range of operating values is a range of possible airspeeds for the aircraft. The current operating value may be an altitude of the aircraft and the fixed range of operating values is a range of possible altitudes for the aircraft. The magnified operating window may be relocated along the fixed range of operating values for the aircraft based, at least in part, upon a change in the current operating value. A visual acceptability indicator may be rendered concerning the current operating value of the aircraft. The visual acceptability indicator concerning the current operating value of the aircraft may include a color change. The visual acceptability indicator concerning the current operating value of the aircraft may be configured to indicate an acceptable operating condition for the aircraft. The visual acceptability indicator concerning the current operating value of the aircraft may be configured to indicate an unacceptable operating condition for the aircraft.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
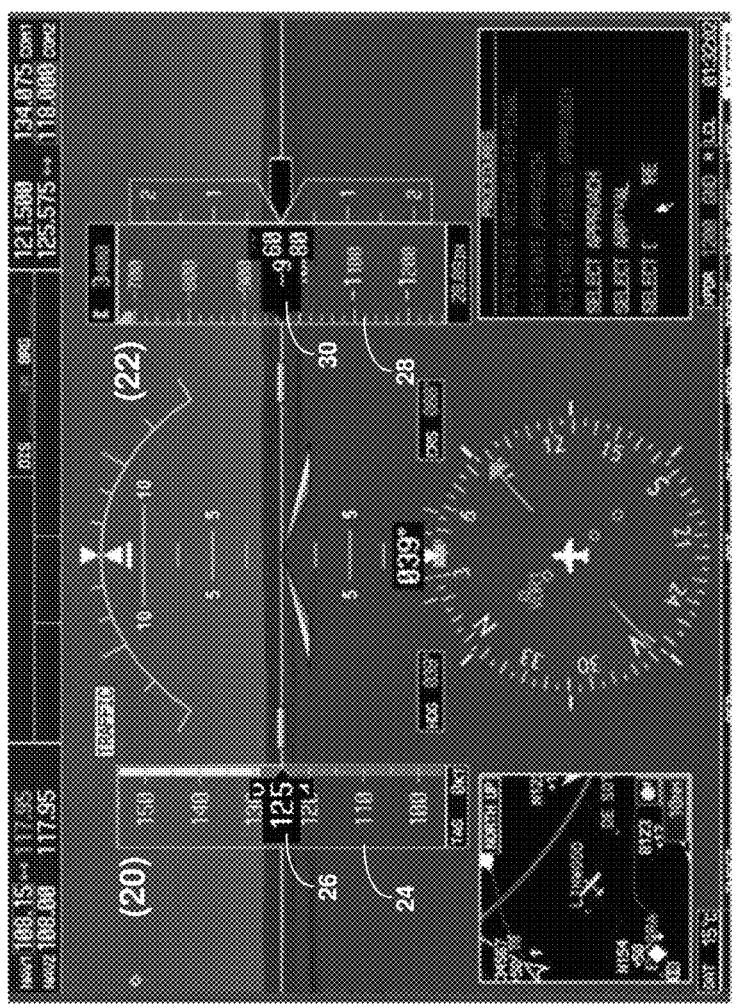
FIG. 1 is a diagrammatic view of a prior art glass cockpit display and several angle-of-attack gauges.
Figure 1:
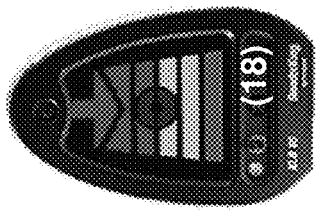
Figure 1:
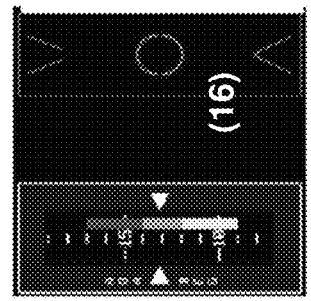
Figure 1:
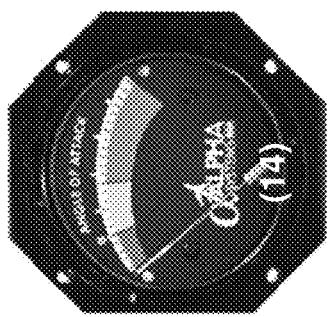
Figure 1:
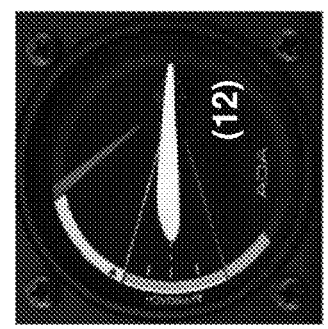
Figure 2:
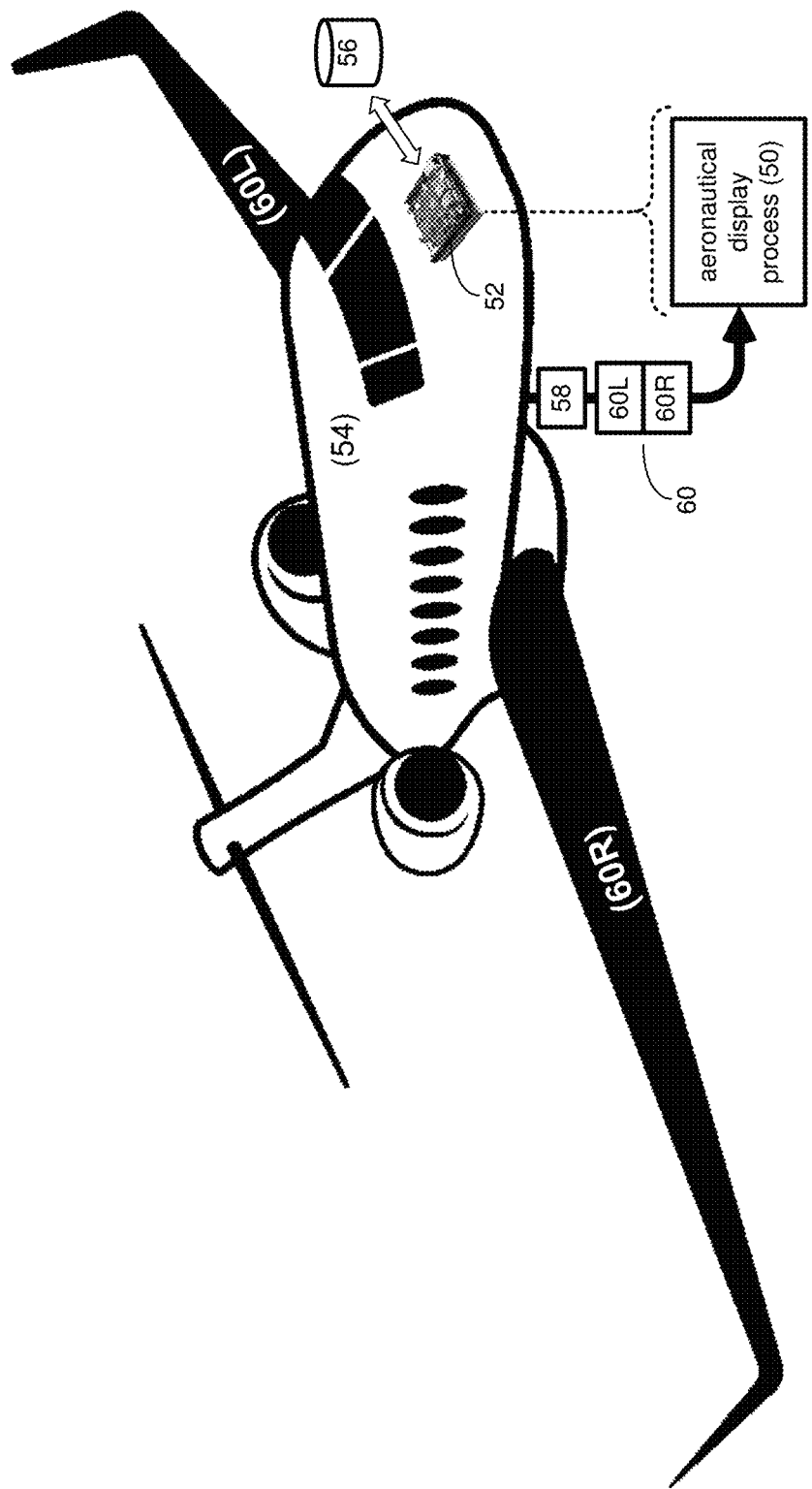
FIG. 2 is a diagrammatic view of an aircraft including a computing device that executes an aeronautical display process according to an embodiment of the present disclosure.
Figure 3:
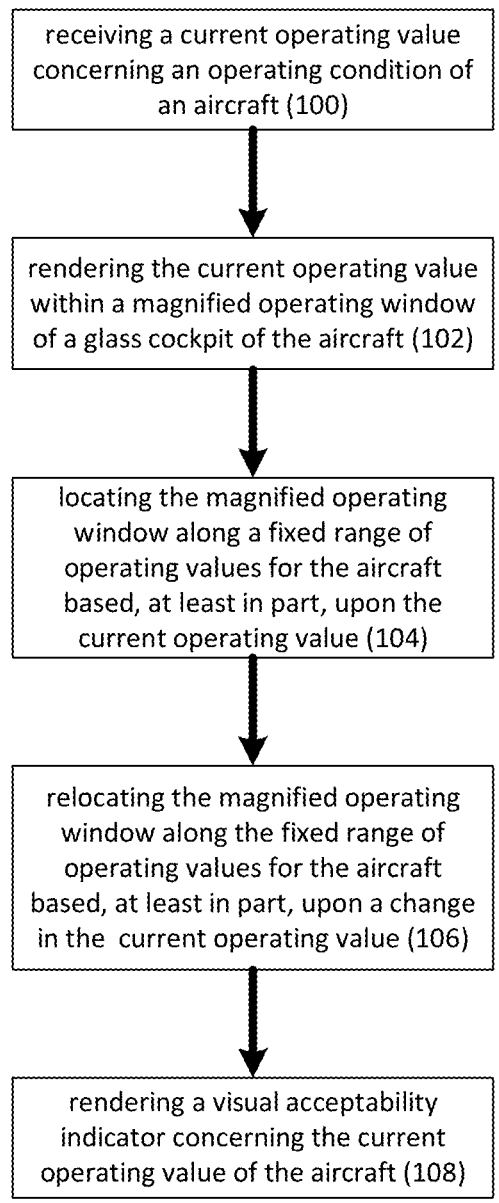
FIG. 3 is a flowchart of an implementation of the aeronautical display process of FIG. 2 according to an embodiment of the present disclosure.

Referring to FIG. 2, there is shown aeronautical display process 50. Aeronautical display process 50 may reside on and may be executed by computing device 52, which may be included within aircraft 14. While aircraft 14 is shown to be a plane, this is for illustrative purposes only and is not intended to be a limitation of this disclosure, as other configurations are possible and are considered to be within the scope of this disclosure. Accordingly, other types of aircraft (e.g., helicopters) are considered to be within the scope of this disclosure.

Examples of computing device 52 may include, but are not limited to: a personal computer, a laptop computer, a notebook computer, a server computer, a single board computer and/or a cloud-based computing platform. The instruction sets and subroutines of aeronautical display process 50, which may be stored on storage device 56 coupled to computing device 52, may be executed by one or more processors (not shown) and one or more memory architectures (not shown) included within computing device 52. Examples of storage device 56 may include but are not limited to: a hard disk drive; a RAID device; a random access memory (RAM); a read-only memory (ROM); and all forms of flash memory storage devices.

Aeronautical Display Process (for Airspeed & Altitude)

Referring also to FIGS. 3-6, aeronautical display process 50 may receive 100 a current operating value (e.g., current operating value 58) concerning an operating condition of an aircraft (e.g., aircraft 54). Examples of current operating value 58 may include but are not limited to: the airspeed of aircraft 54 and the altitude of aircraft 54.

As will be discussed below in greater detail, aeronautical display process 50 may render 102 the current operating value (e.g., current operating value 58) within a magnified operating window (e.g., magnified operating windows 200, 202) of a glass cockpit display (e.g., glass cockpit display 10) of aircraft 54.

Aeronautical display process 50 may locate 104 the magnified operating window (e.g., magnified operating windows 200, 202) along a fixed range of operating values (e.g., fixed ranges 204, 206) for aircraft 54 based, at least in part, upon the current operating value (e.g., current operating value 58).

Airspeed Display

When the current operating value (e.g., current operating value 58) is the airspeed of aircraft 54, the fixed range of operating values (e.g., fixed range 204) may be a range of possible airspeeds for aircraft 54. In this particular example, fixed range 204 is shown to be a range from 40-200 knots (in a fashion similar to a speedometer on a car).

Upon receiving 100 current operating value 58, aeronautical display process 50 may render 102 current operating value 58 (e.g., the airspeed of aircraft 54 in knots in this example) within magnified operating window 200 of glass cockpit display 10 of aircraft 54. Aeronautical display process 50 may then locate 104 magnified operating window 200 along fixed range 204 for aircraft 54 based, at least in part, upon current operating value 58, which is the airspeed to aircraft 54 (in this example).

Figure 4:
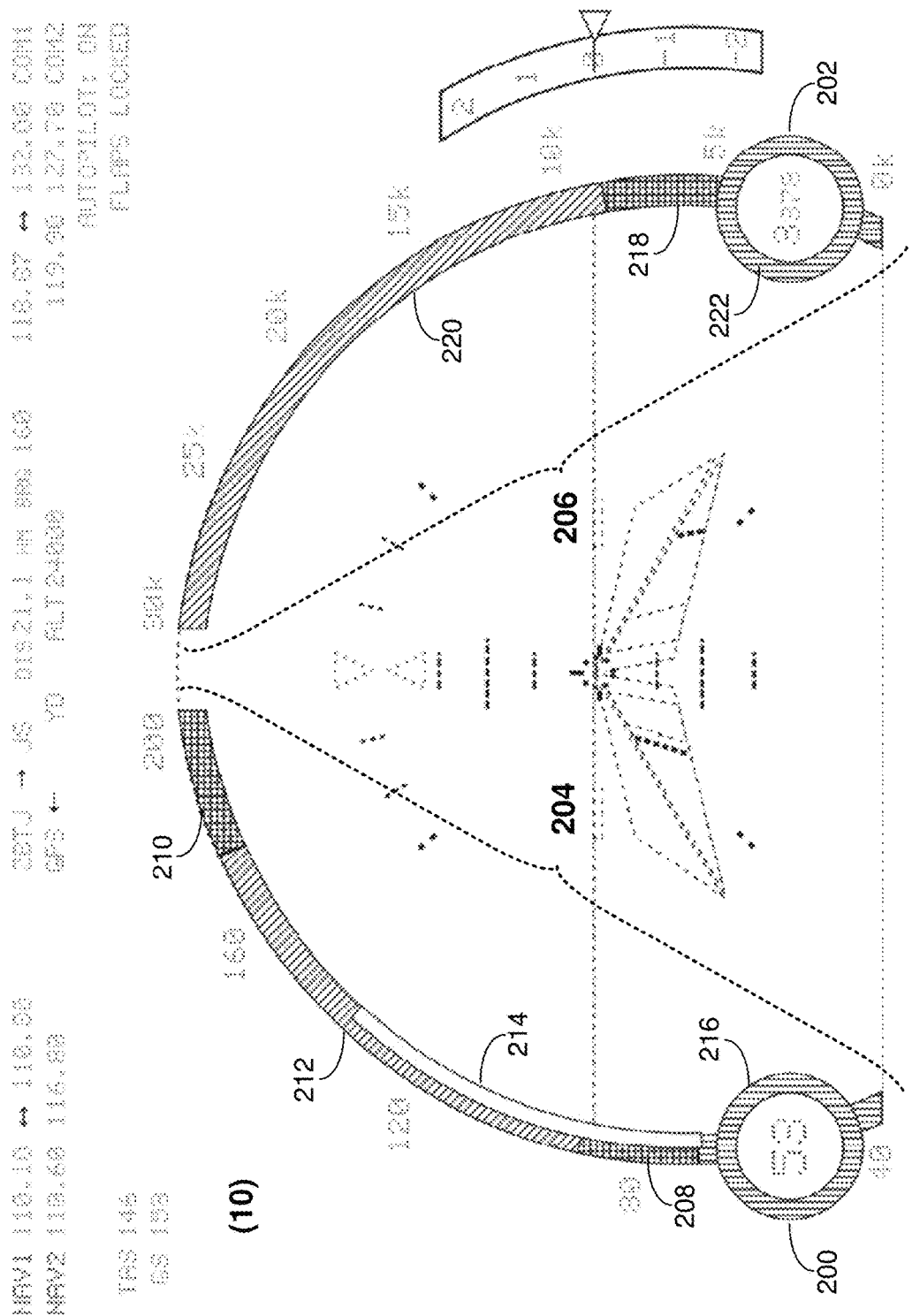
FIG. 4 is a diagrammatic view of a glass cockpit display rendered by the aeronautical display process of FIG. 3 according to an embodiment of the present disclosure.

Assume that in FIG. 4, aircraft 54 is accelerating for takeoff down a runway and is currently doing 53 knots. Accordingly, magnified operating window 200 is positioned at the lower end of fixed range 204 (i.e., proximate the 40 knot lower end of fixed range 204).

Figure 5:
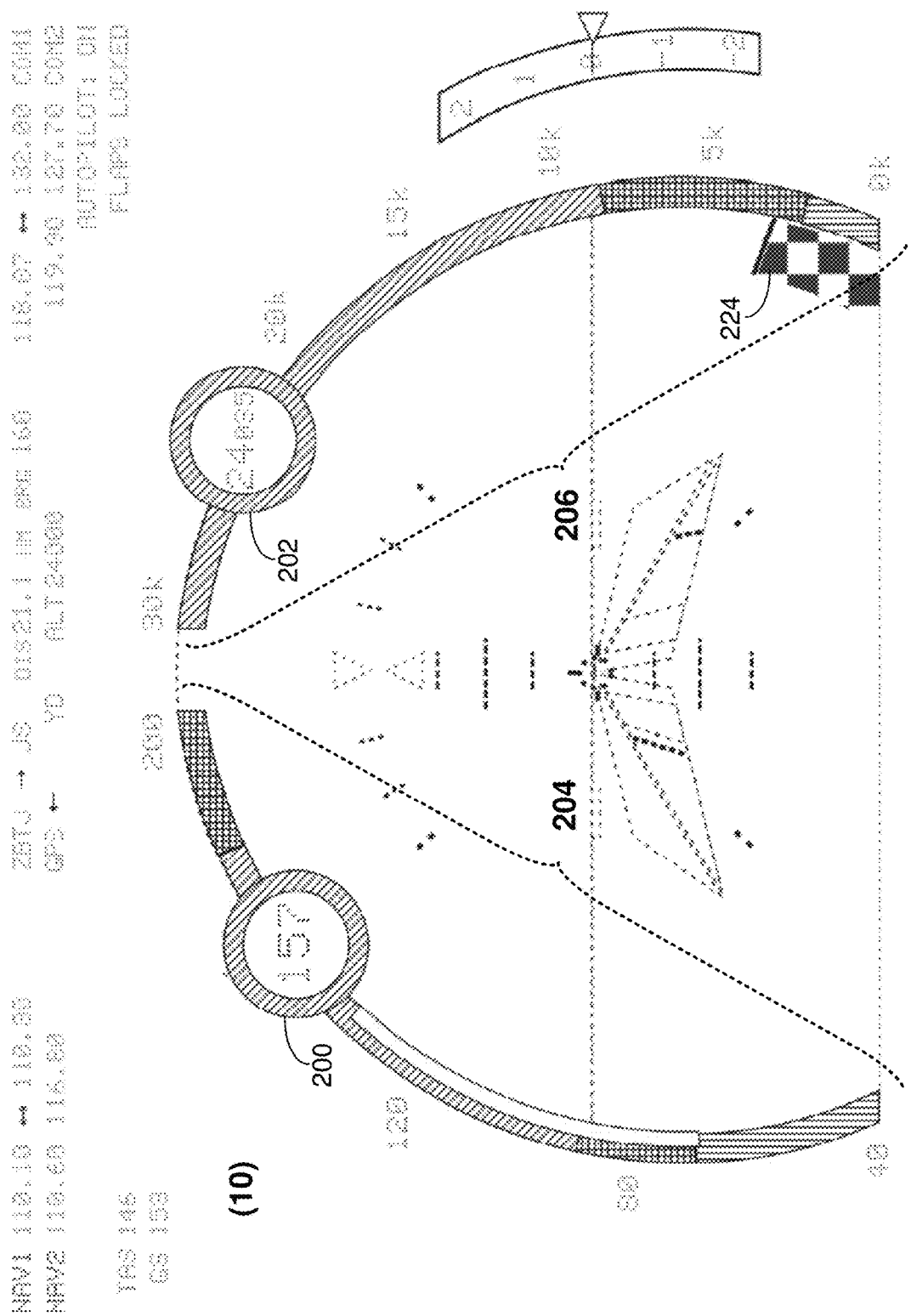
FIG. 5 is a diagrammatic view of a glass cockpit display rendered by the aeronautical display process of FIG. 3 according to an embodiment of the present disclosure.

Once airborne, assume that aircraft 54 accelerates to a cruising velocity of 157 knots. Accordingly, current operating value 58 (i.e., the airspeed of aircraft 54 in this example) received 100 by aeronautical display process 50 may change. Upon receiving this changed current operating value 58 (i.e., the airspeed of aircraft 54 in this example), aeronautical display process 50 may relocate 106 magnified operating window 200 along the fixed range of operating values (e.g., fixed range 204) for aircraft 54 based, at least in part, upon the change in current operating value 58. Accordingly and as shown in FIG. 5, magnified operating window 200 may be relocated 106 upward toward the upper end of fixed range 204 (i.e., proximate the 200 knot upper end of fixed range 204).

Figure 6:
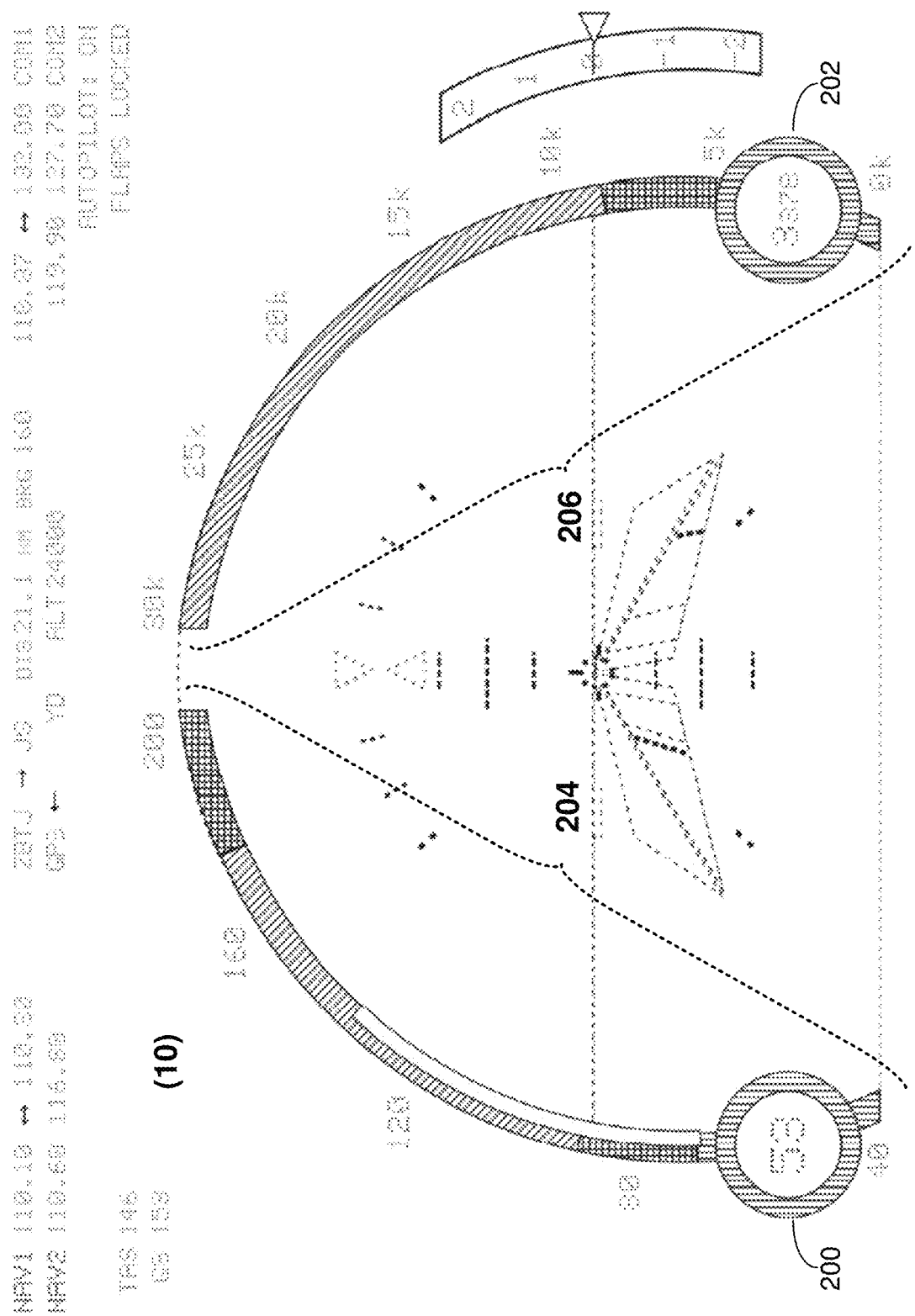
FIG. 6 is a diagrammatic view of a glass cockpit display rendered by the aeronautical display process of FIG. 3 according to an embodiment of the present disclosure.
Figure 7:
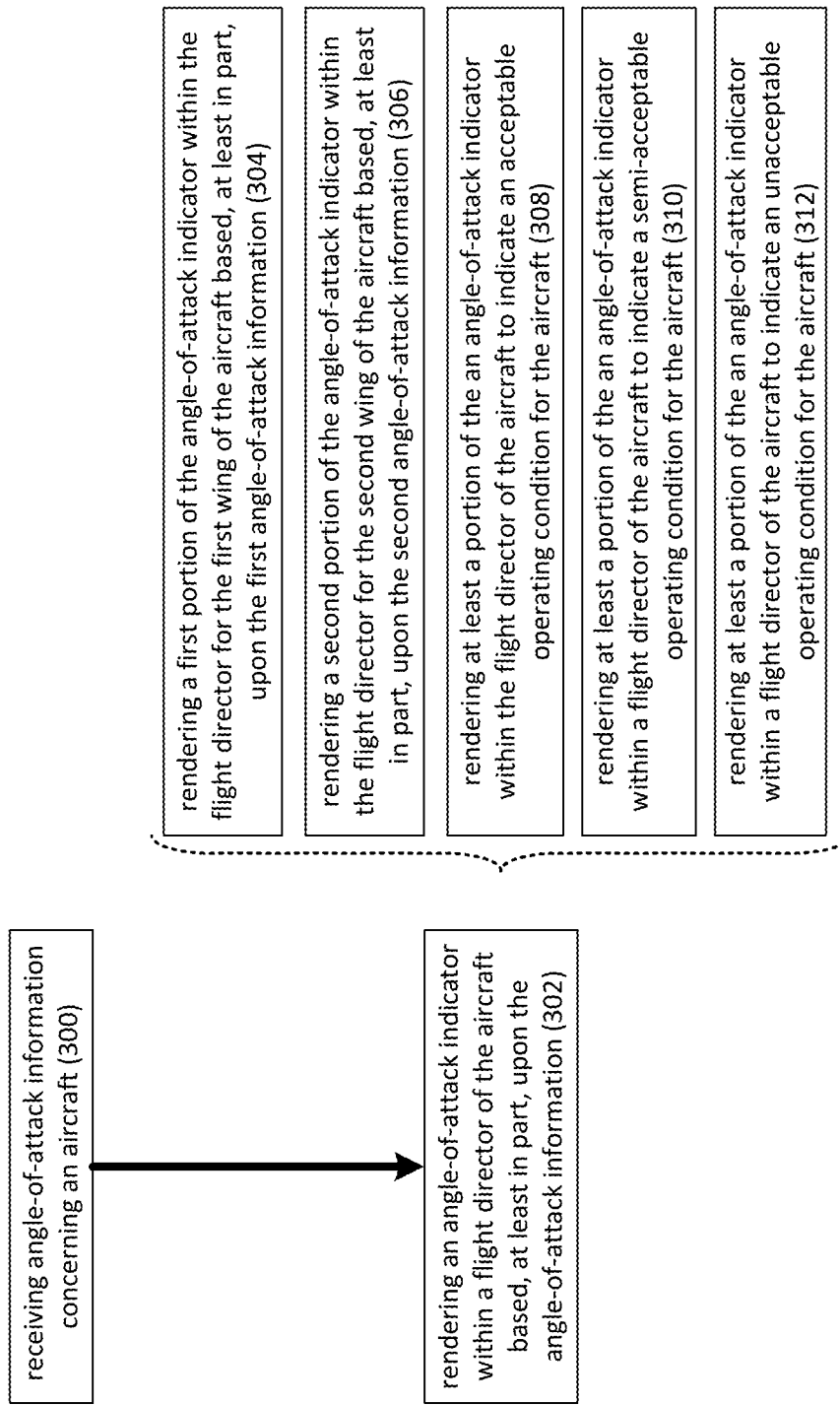
FIG. 7 is a flowchart of another implementation of the aeronautical display process of FIG. 1 according to an embodiment of the present disclosure.

Continuing with the above-stated example, assume that aircraft 54 returns to its original airport and has just landed and is decelerating on the runway from which it took off. Accordingly, current operating value 58 (i.e., the airspeed of aircraft 54 in this example) received 100 by aeronautical display process 50 may change. Upon receiving this changed current operating value 58 (i.e., the airspeed of aircraft 54 in this example), aeronautical display process 50 may relocate 106 magnified operating window 200 along the fixed range of operating values (e.g., fixed range 204) for aircraft 54 based, at least in part, upon the change in current operating value 58. Accordingly and as shown in FIG. 6, magnified operating window 200 may be relocated 106 downward toward the lower end of fixed range 204 (i.e., proximate the 40 knot lower end of fixed range 204).

Altitude Display

When the current operating value (e.g., current operating value 58) is the altitude of aircraft 54, the fixed range of operating values (e.g., fixed range 206) is a range of possible altitudes for aircraft 54. In this particular example, fixed range 206 is shown to be a range from 0-30,000 feet (again, in a fashion similar to a speedometer on a car).

Upon receiving 100 current operating value 58, aeronautical display process 50 may render 102 current operating value 58 (e.g., the altitude of aircraft 54 in feet in this example) within magnified operating window 202 of glass cockpit display 10 of aircraft 54. Aeronautical display process 50 may then locate 104 magnified operating window 202 along fixed range 206 for aircraft 54 based, at least in part, upon current operating value 58, which is the altitude of aircraft 12 (in this example).

Assume that in FIG. 4, aircraft 54 is accelerating for takeoff down a runway that is located at an elevation of 3,378. Accordingly, magnified operating window 202 is positioned at the lower end of fixed range 206 (i.e., proximate the 0 feet lower end of fixed range 206).

Once airborne, assume that aircraft 54 climbs to a cruising altitude of 24,035 feet. Accordingly, current operating value 58 (i.e., the altitude of aircraft 54 in this example) received 100 by aeronautical display process 50 may change. Upon receiving this changed current operating value 58 (i.e., the altitude of aircraft 54 in this example), aeronautical display process 50 may relocate 106 magnified operating window 202 along the fixed range of operating values (e.g., fixed range 206) for aircraft 54 based, at least in part, upon the change in current operating value 58. Accordingly and as shown in FIG. 5, magnified operating window 202 may be relocated 106 upward toward the upper end of fixed range 206 (i.e., proximate the 30,000 feet upper end of fixed range 206).

Continuing with the above-stated example, assume that aircraft 54 returns to its original airport and has just landed and is decelerating on the runway from which it took off. Accordingly, current operating value 58 (i.e., the altitude of aircraft 54 in this example) received 100 by aeronautical display process 50 may change. Upon receiving this changed current operating value 58 (i.e., the altitude of aircraft 54 in this example), aeronautical display process 50 may relocate 106 magnified operating window 202 along the fixed range of operating values (e.g., fixed range 206) for aircraft 54 based, at least in part, upon the change in current operating value 58. Accordingly and as shown in FIG. 6, magnified operating window 202 may be relocated 106 downward toward the lower end of fixed range 206 (i.e., proximate the 0 feet lower end of fixed range 206).

Visual Indicators

Aeronautical display process 50 may render 108 a visual acceptability indicator concerning the current operating value of aircraft 54. For example and as will be explained below in greater detail, this visual acceptability indicator concerning the current operating value of aircraft 54 may include a color change and may be configured to: indicate an acceptable operating condition for aircraft 54 and indicate an unacceptable operating condition for aircraft 54.

For example and with respect to the airspeed of aircraft 54, aeronautical display process 50 may render 108 a plurality of visual acceptability indicators into the fixed range of operating values (e.g., fixed range 204) that concern the current operating value of aircraft 54.

Specifically, fixed range 204 may be rendered 108 to include:
- red and/or yellow "underspeed" airspeed range 208 for aircraft 54 (proximate the lower end of fixed range 204);
- red and/or yellow "overspeed" airspeed range 210 for aircraft 54 (proximate the upper end of fixed range 204);
- green "cruising speed" airspeed range 212 for aircraft 54 (proximate the middle of fixed range 204); and
- "flaps allowed" range 214 for aircraft 54.

Additionally, aeronautical display process 50 may render 108 outer periphery 216 of magnified operating window 200 to match the above-described color-coding scheme (e.g., red and/or yellow when in "underspeed" airspeed range 208 or "overspeed" airspeed range 210; and green when in "cruising speed" airspeed range 212).

Further, fixed range 206 may be rendered 108 to include:
- red and/or yellow "low" altitude range 218 for aircraft 54 (proximate the lower end of fixed range 206); and
- green "cruising" altitude range 220 for aircraft 54 (positioned above "low" altitude range 218).

Additionally, aeronautical display process 50 may render 108 outer periphery 222 of magnified operating window 202 to match the above-described color-coding scheme (e.g., red and/or yellow when in "low" altitude range 218; and green when in "cruising" altitude range 220). Further, aeronautical display process 50 may render 108 ground/grade indicator 224 within fixed range 206 to indicate grade level.

Angle-of-Attack Display

As is known in the art and in aerodynamics, the angle-of-attack specifies the angle between the chord line of the wing of a fixed-wing aircraft and the vector representing the relative motion between the aircraft and the atmosphere. The lift coefficient of a fixed-wing aircraft varies with angle-of-attack. Increasing angle-of-attack is associated with increasing lift coefficient up to the maximum lift coefficient, after which lift coefficient decreases. As the angle-of-attack of a fixed-wing aircraft increases, separation of the airflow from the upper surface of the wing becomes more pronounced, leading to a reduction in the rate of increase of the lift coefficient. Cambered airfoils are curved such that they generate some lift at small negative angle-of-attack. A symmetrical wing has zero lift at 0 degrees angle-of-attack. The lift curve is also influenced by the wing shape, including its airfoil section and wing planform. A swept wing has a lower, flatter curve with a higher critical angle.

The critical angle-of-attack is the angle-of-attack which produces the maximum lift coefficient. This is also called the "stall angle-of-attack". Below the critical angle-of-attack, as the angle-of-attack decreases, the lift coefficient decreases. Conversely, above the critical angle-of-attack, as the angle-of-attack increases, the air begins to flow less smoothly over the upper surface of the airfoil and begins to separate from the upper surface. On most airfoil shapes, as the angle-of-attack increases, the upper surface separation point of the flow moves from the trailing edge towards the leading edge. At the critical angle-of-attack, upper surface flow is more separated and the airfoil or wing is producing its maximum lift coefficient. As the angle of attack increases further, the upper surface flow becomes more fully separated and the lift coefficient reduces further.

Above this critical angle of attack, the aircraft is said to be in a stall. A fixed-wing aircraft by definition is stalled at or above the critical angle of attack rather than at or below a particular airspeed. The airspeed at which the aircraft stalls varies with the weight of the aircraft, the load factor, the center of gravity of the aircraft and other factors. However, the aircraft always stalls at the same critical angle of attack. The critical or stalling angle of attack is typically around 15°-20° for many airfoils.

Referring also to FIGS. 7-12 and as will be discussed below in greater detail, aeronautical display process 50 may receive 300 angle-of-attack information 60 concerning aircraft 14 and may render 302 an angle-of-attack indicator (e.g., angle of attack indicator 400) within a flight director (e.g., flight director 402) of aircraft 54 based, at least in part, upon angle-of-attack information 60.

By including the angle-of-attack indicator (e.g., angle of attack indicator 400) within flight director 402 of aircraft 54, a system is created that does not require the pilot of aircraft 54 to take their eyes off of glass cockpit 50 to read a separate angle of attack gauge.

The angle-of-attack indicator (e.g., angle of attack indicator 400) may be a multi-portion angle-of-attack indicator, wherein angle-of-attack information 60 may include: first angle-of-attack information 60L concerning a first wing (e.g., left wing 62L) of aircraft 54; and second angle-of-attack information 60R concerning a second wing (e.g., right wing 62R) of aircraft 54.

Accordingly and when rendering 302 an angle-of-attack indicator (e.g., angle of attack indicator 400) within a flight director (e.g., flight director 402) of aircraft 54 based, at least in part, upon the angle-of-attack information (e.g., angle-of-attack information 20), aeronautical display process 50 may render 304 a first portion (e.g., first portion 404) of the angle-of-attack indicator (e.g., angle of attack indicator 400) within the flight director (e.g., flight director 402) for the first wing (e.g., left wing 62L) of aircraft 54 based, at least in part, upon first angle-of-attack information 60L.

Further and when rendering 302 an angle-of-attack indicator (e.g., angle of attack indicator 400) within a flight director (e.g., flight director 402) of aircraft 54 based, at least in part, upon the angle-of-attack information (e.g., angle-of-attack information 20), aeronautical display process 50 may render 306 a second portion e.g., second portion 406) of the angle-of-attack indicator (e.g., angle of attack indicator 400) within the flight director (e.g., flight director 402) for the second wing (e.g., right wing 62R) of aircraft 54 based, at least in part, upon second angle-of-attack information 60R.

Accordingly and through the use of the above-described system, the angle-of-attack may be monitored for each wing separately to avoid situations that may result in a single wing aerodynamic stall (e.g., when an aircraft is subjected to aggressive ruddering that greatly reduces airflow across a single wing).

Figure 8:
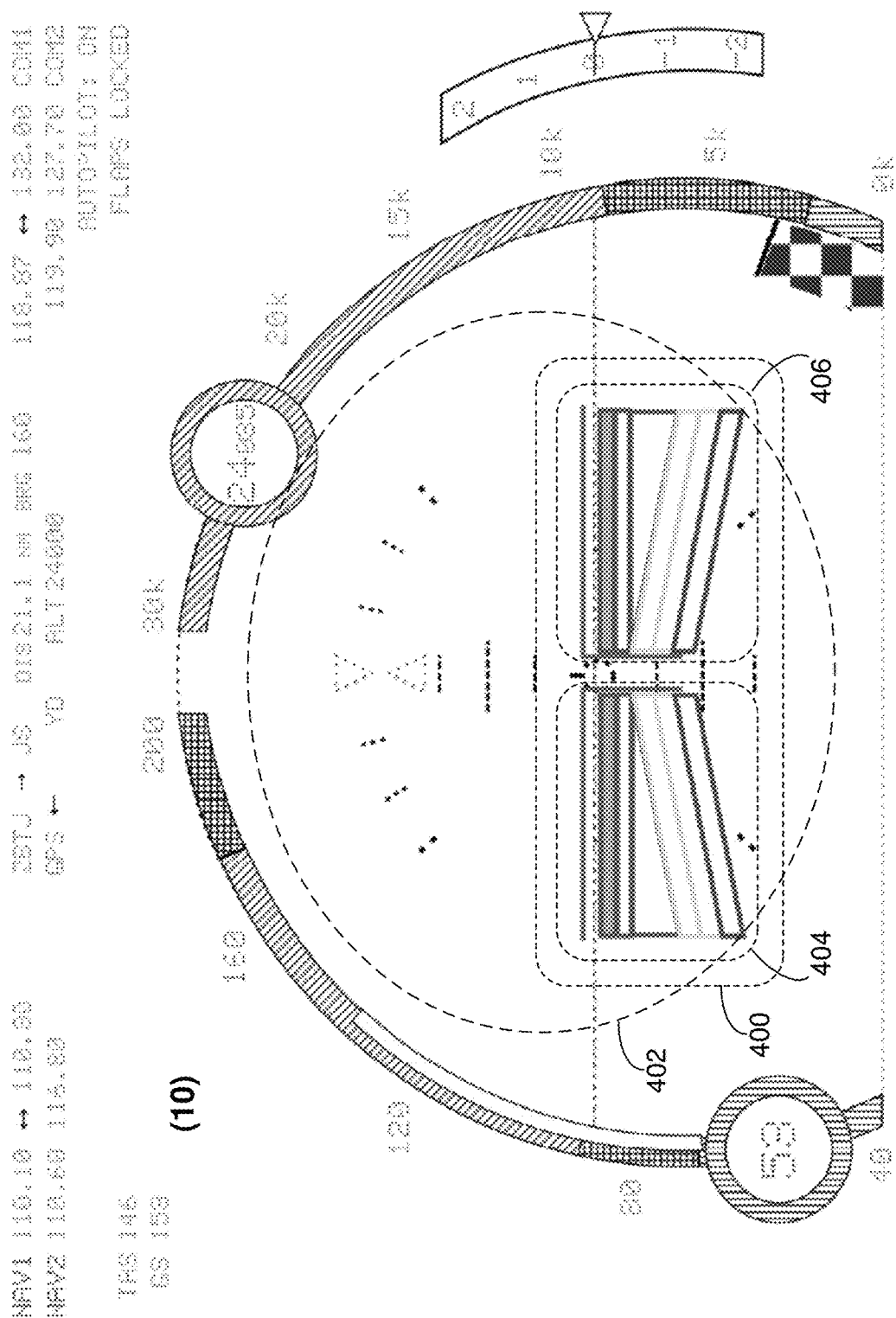
FIG. 8 is a diagrammatic view of a glass cockpit display rendered by the aeronautical display process of FIG. 7 according to an embodiment of the present disclosure.
Figure 8A:
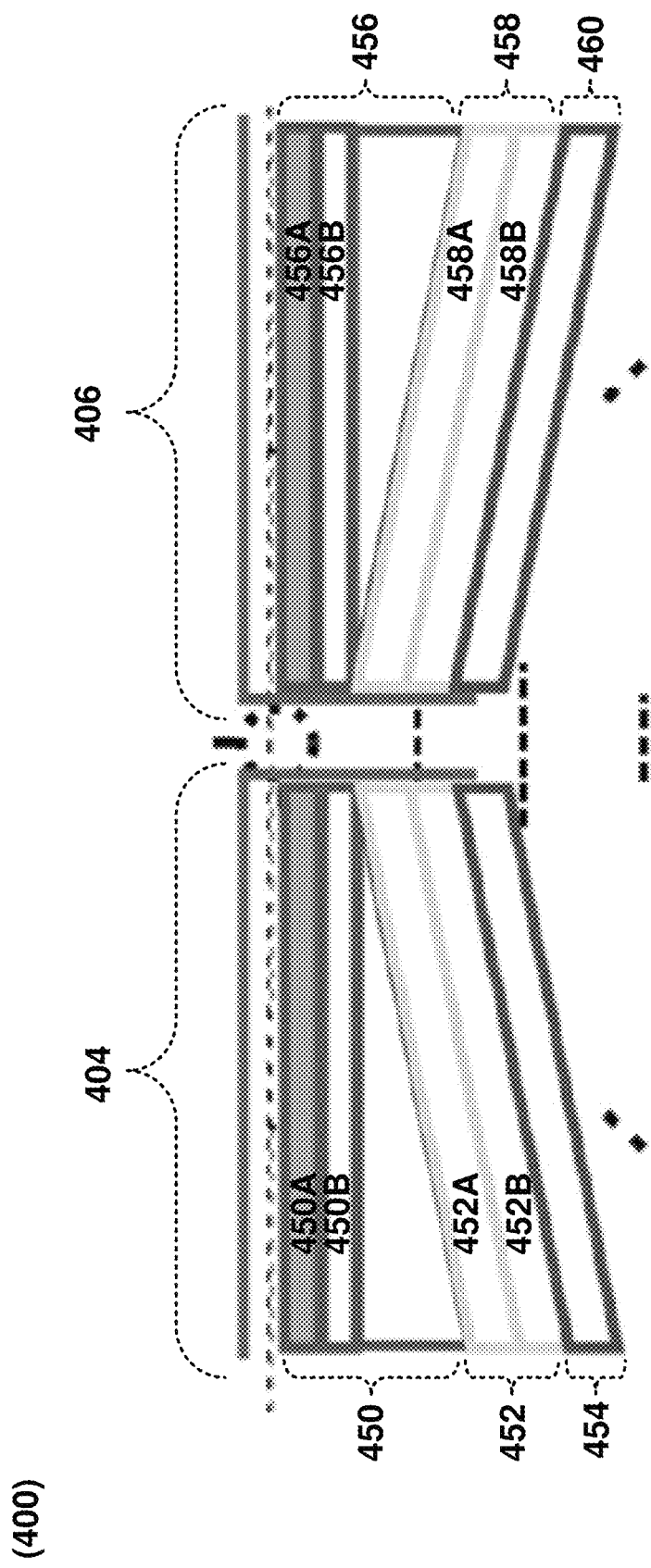
FIG. 8A is a diagrammatic detail view of an angle-of-attack indicator rendered by the aeronautical display process of FIG. 7.

Referring also to FIG. 8A and as will be discussed below, angle-of-attack indicator 400 may be a visual angle-of-attack indicator (in a fashion similar to that of the airspeed and altitude indicators described above).

As discussed above, angle of attack indicator 400 may be a multi-portion angle-of-attack indicator, and may include:
  a first portion (e.g., first portion 404) for the first wing (e.g., left wing 62L) of aircraft 54; and
  a second portion e.g., second portion 406) for the second wing (e.g., right wing 62R) of aircraft 54.

Portion 404 may include multiple sections (e.g., sections 450, 452, 454) that may be indicative of the angle-of-attack being experienced by left wing 62L, while portion 406 may include multiple sections (e.g., sections 456; 458; 460) that may be indicative of the angle-of-attack being experienced by right wing 62R.

For example and with respect to left wing 62L:
  section 450 of first portion 404 may include:
    1. Subsection 450A for indicating a low angle-of-attack for left wing 62L if illuminated (typically green).
    2. Subsection 450B for indicating a safe angle-of-attack for left wing 62L if illuminated (typically green).
  section 452 of first portion 404 may include:
    1. Subsection 452A for indicating a high angle-of-attack for left wing 62L if illuminated (typically yellow).
    2. Subsection 452B for indicating a dangerously high angle-of-attack for left wing 62L if illuminated (typically yellow).
  section 454 of first portion 404 for indicating an aerodynamic stall of left wing 62L if illuminated (typically red) and may result in one or more audible alarms sounding within the cockpit of aircraft 14.

For example and with respect to right wing 62R:
  section 456 of second portion 406 may include:
    1. Subsection 456A for indicating a low angle-of-attack for right wing 62R if illuminated (typically green).
    2. Subsection 456B for indicating a safe angle-of-attack for right wing 62R if illuminated (typically green).
  section 458 of second portion 406 may include:
    1. Subsection 458A for indicating a high angle-of-attack for right wing 62R if illuminated (typically yellow).
    2. Subsection 458B for indicating a dangerously high angle-of-attack for right wing 62R if illuminated (typically yellow).
  section 460 of second portion 406 for indicating an aerodynamic stall of right wing 62R if illuminated (typically red) and may result in one or more audible alarms sounding within the cockpit of aircraft 14.

Accordingly and when rendering 302 an angle-of-attack indicator (e.g., angle of attack indicator 400) within a flight director (e.g., flight director 402) of aircraft 54 based, at least in part, upon the angle-of-attack information (e.g., angle-of-attack information 20), aeronautical display process 50 may render 308 at least a portion of the angle-of-attack indicator (e.g., angle of attack indicator 400) within the flight director (e.g., flight director 402) of aircraft 54 to indicate an acceptable operating condition for aircraft 54 (e.g., a low angle-of-attack or a safe angle-of-attack).

Further and when rendering 302 an angle-of-attack indicator (e.g., angle of attack indicator 400) within a flight director (e.g., flight director 402) of aircraft 54 based, at least in part, upon the angle-of-attack information (e.g., angle-of-attack information 20), aeronautical display process 50 may render 310 at least a portion of the angle-of-attack indicator (e.g., angle of attack indicator 400) within a flight director (e.g., flight director 402) of aircraft 54 to indicate a questionable operating condition for aircraft 54 (e.g., a high angle-of-attack or a dangerously high angle-of-attack).

Additionally and when rendering 302 an angle-of-attack indicator (e.g., angle of attack indicator 400) within a flight director (e.g., flight director 402) of aircraft 54 based, at least in part, upon the angle-of-attack information (e.g., angle-of-attack information 20), aeronautical display process 50 may render 312 at least a portion of the angle-of-attack indicator (e.g., angle of attack indicator 400) within a flight director (e.g., flight director 402) of aircraft 54 to indicate an unacceptable operating condition for aircraft 54 (e.g., an aerodynamic stall).

Figure 9:
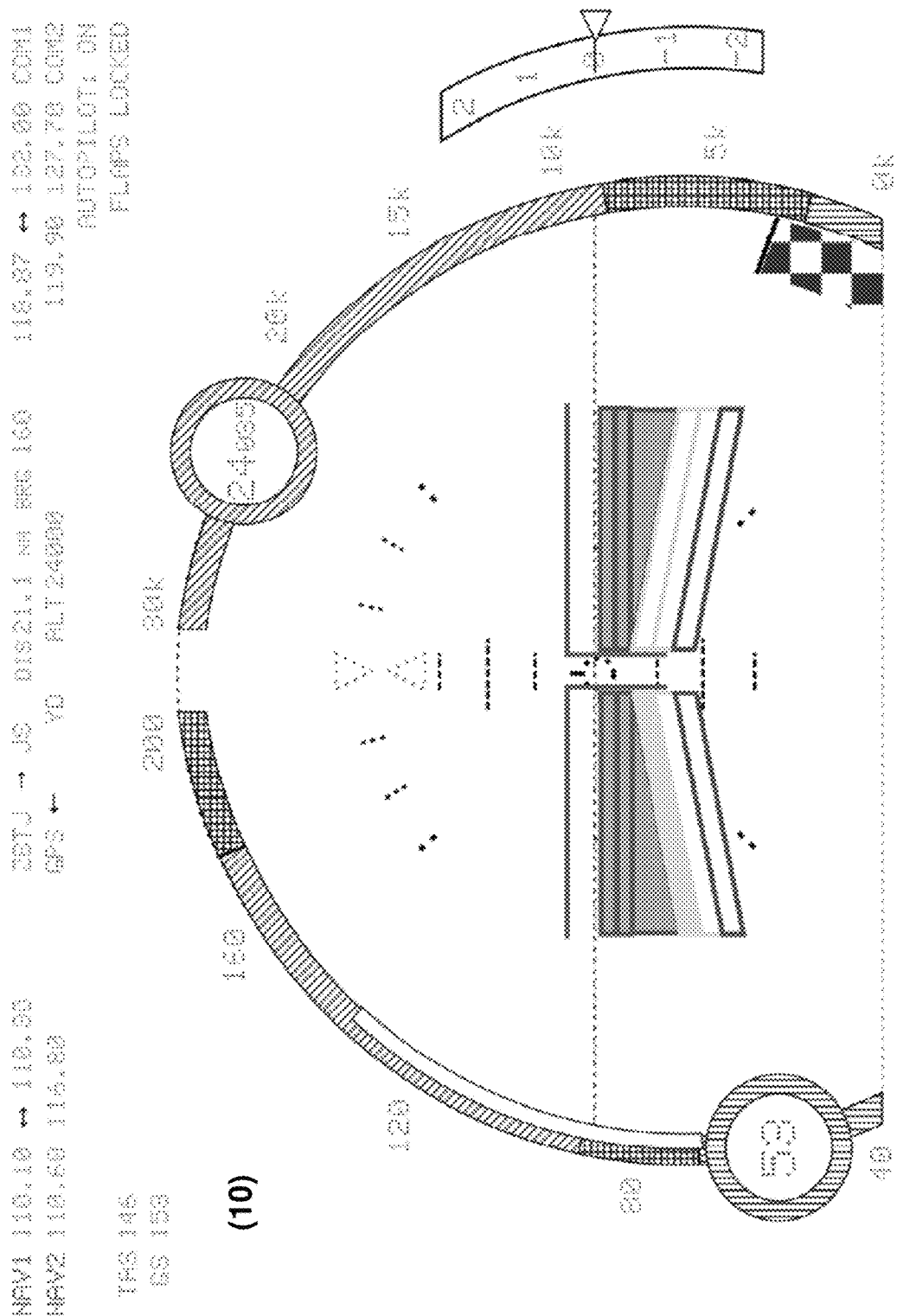
FIG. 9 is a diagrammatic view of a glass cockpit display rendered by the aeronautical display process of FIG. 7 according to an embodiment of the present disclosure.
Figure 10:
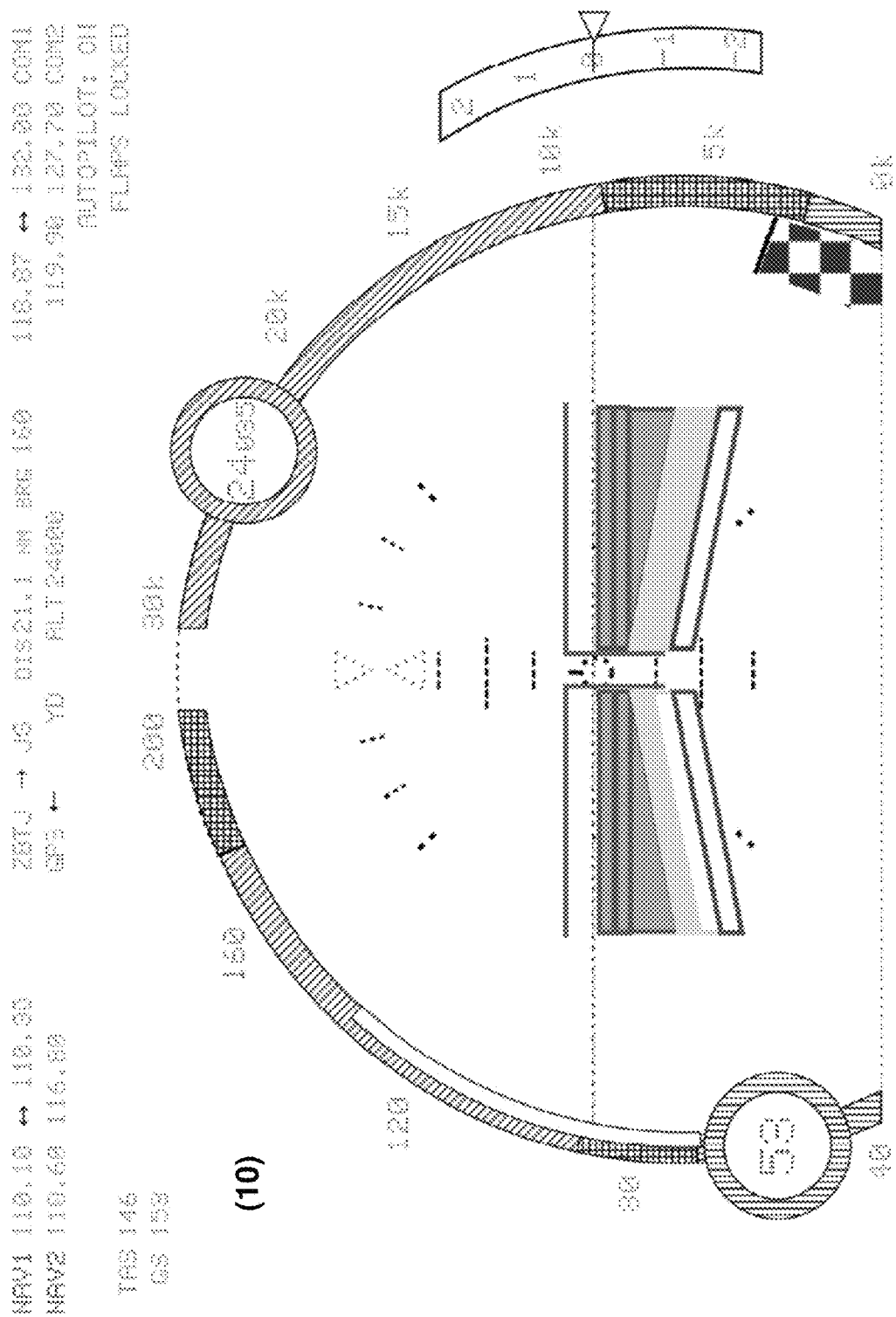
FIG. 10 is a diagrammatic view of a glass cockpit display rendered by the aeronautical display process of FIG. 7 according to an embodiment of the present disclosure.
Figure 11:
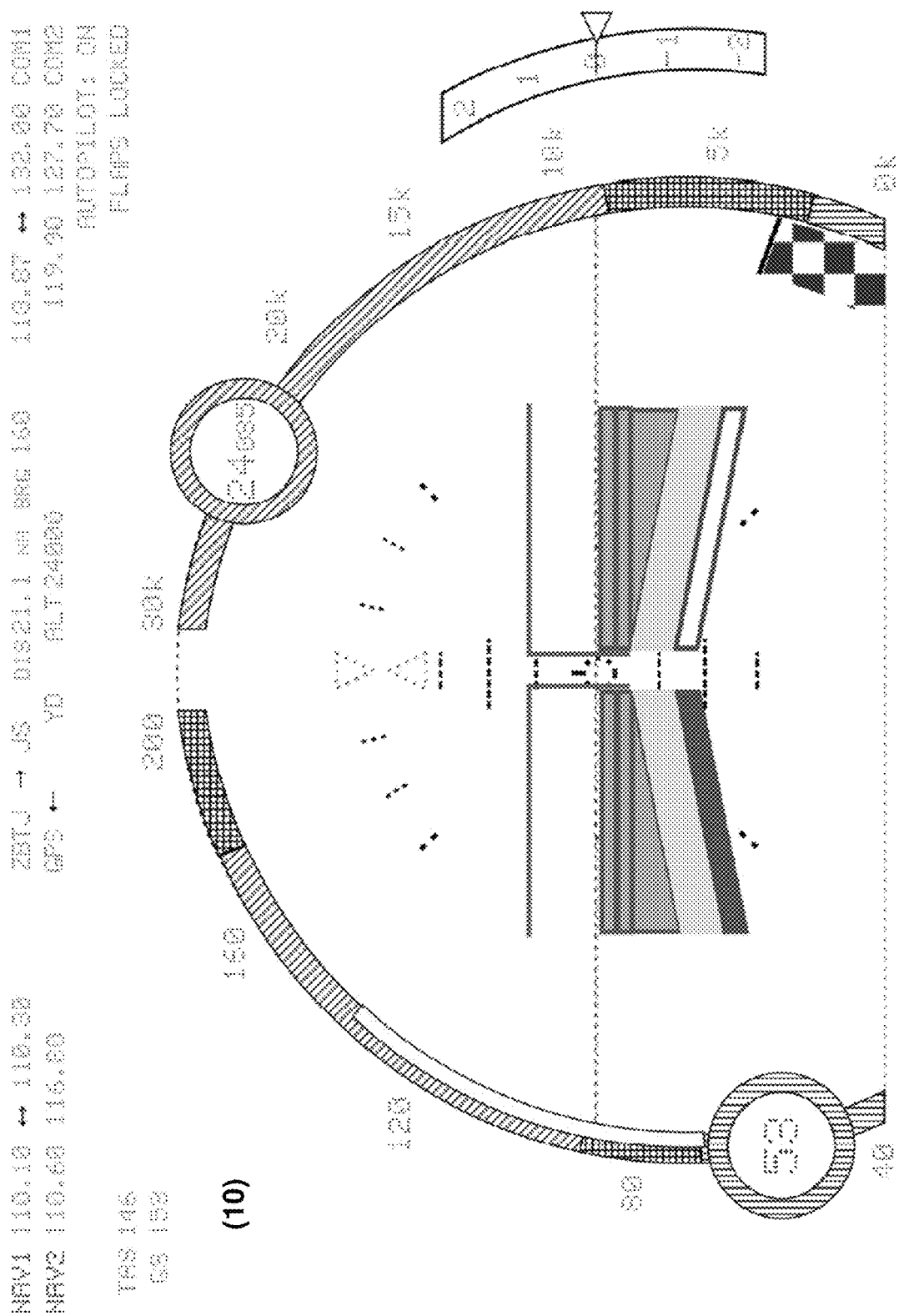
FIG. 11 is a diagrammatic view of a glass cockpit display rendered by the aeronautical display process of FIG. 7 according to an embodiment of the present disclosure.
Figure 12:
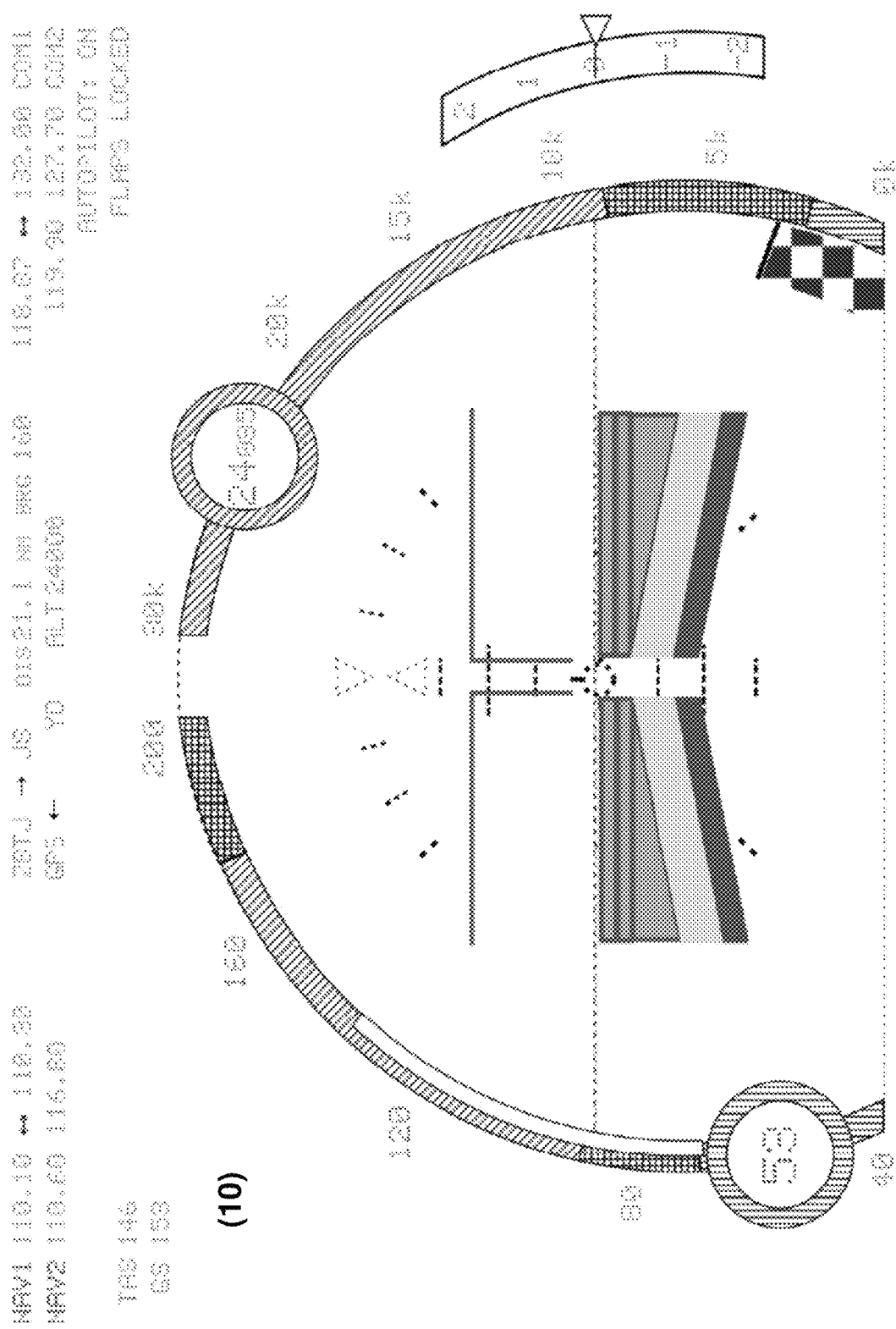
FIG. 12 is a diagrammatic view of a glass cockpit display rendered by the aeronautical display process of FIG. 7 according to an embodiment of the present disclosure.

Accordingly and concerning such indications:
FIG. 8 is indicative of a low angle-of-attack for left wing 62L and a low angle-of-attack for right wing 62R;
FIG. 9 is indicative of a high angle-of-attack for left wing 62L and a safe angle-of-attack for right wing 62R;
FIG. 10 is indicative of a high angle-of-attack for left wing 62L and a dangerously high angle-of-attack for right wing 62R;
FIG. 11 is indicative of an aerodynamic stall of left wing 62L and a dangerously high angle-of-attack for right wing 62R; and
FIG. 12 is indicative of an aerodynamic stall of left wing 62L and an aerodynamic stall of right wing 62R;

The manner (e.g., shape and appearance) in which angle of attack indicator 400 is shown in FIGS. 8-12 and FIG. 8A is for illustrative purposes only and is not intended to be a limitation of this disclosure, as the appearance of angle of attack indicator 400 may be varied to adhere to various design criteria.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a current operating value concerning an operating condition of an aircraft;
   rendering the current operating value within a magnified operating window of a glass cockpit of the aircraft; and
   locating the magnified operating window along a fixed range of operating values for the aircraft based, at least in part, upon the current operating value,
   wherein the current operating value is an airspeed of the aircraft and the fixed range of operating values is a range of possible airspeeds for the aircraft, or
   wherein the current operating value is an altitude of the aircraft and the fixed range of operating values is a range of possible altitudes for the aircraft.

2. The computer-implemented method of claim 1 further comprising:
   relocating the magnified operating window along the fixed range of operating values for the aircraft based, at least in part, upon a change in the current operating value.

3. The computer-implemented method of claim 1 further comprising:
   rendering a visual acceptability indicator concerning the current operating value of the aircraft.

4. The computer-implemented method of claim 3 wherein the visual acceptability indicator concerning the current operating value of the aircraft includes a color change.

5. The computer-implemented method of claim 3 wherein the visual acceptability indicator concerning the current operating value of the aircraft is configured to indicate an acceptable operating condition for the aircraft.

6. The computer-implemented method of claim 3 wherein the visual acceptability indicator concerning the current operating value of the aircraft is configured to indicate an unacceptable operating condition for the aircraft.

7. A non-transitory computer program product residing on a computer readable medium having a plurality of instructions stored thereon which, when executed by a processor, cause the processor to perform operations comprising:
   receiving a current operating value concerning an operating condition of an aircraft;
   rendering the current operating value within a magnified operating window of a glass cockpit of the aircraft; and
   locating the magnified operating window along a fixed range of operating values for the aircraft based, at least in part, upon the current operating value,
   wherein the current operating value is an airspeed of the aircraft and the fixed range of operating values is a range of possible airspeeds for the aircraft, or
   wherein the current operating value is an altitude of the aircraft and the fixed range of operating values is a range of possible altitudes for the aircraft.

8. The non-transitory computer program product of claim 7 further comprising:
   relocating the magnified operating window along the fixed range of operating values for the aircraft based, at least in part, upon a change in the current operating value.

9. The non-transitory computer program product of claim 7 further comprising:
   rendering a visual acceptability indicator concerning the current operating value of the aircraft.

10. The non-transitory computer program product of claim 9 wherein the visual acceptability indicator concerning the current operating value of the aircraft includes a color change.

11. The non-transitory computer program product of claim 9 wherein the visual acceptability indicator concerning the current operating value of the aircraft is configured to indicate an acceptable operating condition for the aircraft.

12. The non-transitory computer program product of claim 9 wherein the visual acceptability indicator concerning the current operating value of the aircraft is configured to indicate an unacceptable operating condition for the aircraft.

13. A computing system including a processor and memory configured to perform operations comprising:
   receiving a current operating value concerning an operating condition of an aircraft;
   rendering the current operating value within a magnified operating window of a glass cockpit of the aircraft; and
   locating the magnified operating window along a fixed range of operating values for the aircraft based, at least in part, upon the current operating value,
   wherein the current operating value is an airspeed of the aircraft and the fixed range of operating values is a range of possible airspeeds for the aircraft, or wherein the current operating value is an altitude of the aircraft and the fixed range of operating values is a range of possible altitudes for the aircraft.

14. The computing system of claim 13 further comprising: relocating the magnified operating window along the fixed range of operating values for the aircraft based, at least in part, upon a change in the current operating value.

15. The computing system of claim 13 further comprising: rendering a visual acceptability indicator concerning the current operating value of the aircraft.

16. The computing system of claim 15 wherein the visual acceptability indicator concerning the current operating value of the aircraft includes a color change.

17. The computing system of claim 15 wherein the visual acceptability indicator concerning the current operating value of the aircraft is configured to indicate an acceptable operating condition for the aircraft.

18. The computing system of claim 15 wherein the visual acceptability indicator concerning the current operating value of the aircraft is configured to indicate an unacceptable operating condition for the aircraft.

\* \* \* \* \*